(12) United States Patent
Park

(10) Patent No.: US 8,599,464 B2
(45) Date of Patent: Dec. 3, 2013

(54) OPTICAL IMAGE SHUTTER

(75) Inventor: Yong-hwa Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 463 days.

(21) Appl. No.: 12/689,603

(22) Filed: Jan. 19, 2010

(65) Prior Publication Data
US 2010/0182671 A1 Jul. 22, 2010

(30) Foreign Application Priority Data

Jan. 19, 2009 (KR) .................. 10-2009-0004198

(51) Int. Cl.
G02F 1/03 (2006.01)
G02B 1/10 (2006.01)

(52) U.S. Cl.
USPC .......................... 359/245; 359/578; 359/586

(58) Field of Classification Search
USPC ........ 359/240, 245, 585–586; 385/27, 37, 39, 385/40, 123, 129, 142; 348/240.3, 240.99, 348/363; 367/149, 153; 349/2, 43, 201
See application file for complete search history.

(56) References Cited

U.S. PATENT DOCUMENTS

| 4,362,383 | A | * | 12/1982 | Yonehara et al. | ............... | 355/71 |
| 4,422,167 | A | * | 12/1983 | Shajenko | ...................... | 367/149 |
| 5,799,231 | A | * | 8/1998 | Gates et al. | .................... | 399/115 |
| 6,100,517 | A | | 8/2000 | Yahav et al. | | |
| 6,331,911 | B1 | | 12/2001 | Manassen et al. | | |
| 6,794,628 | B2 | | 9/2004 | Yahav et al. | | |
| 6,806,923 | B2 | * | 10/2004 | Lee et al. | ......................... | 349/64 |
| 6,980,719 | B2 | * | 12/2005 | Andrieu et al. | ................. | 385/40 |
| 7,016,519 | B1 | | 3/2006 | Nakamura et al. | | |
| 7,095,487 | B2 | | 8/2006 | Gonzalez-Banos et al. | | |
| 7,319,560 | B2 | * | 1/2008 | Gunning et al. | ............... | 359/578 |
| 7,457,495 | B2 | * | 11/2008 | Dimmick et al. | ................ | 385/37 |
| 7,573,578 | B2 | * | 8/2009 | Zribi et al. | ..................... | 356/454 |
| 7,583,300 | B2 | * | 9/2009 | Nanjo et al. | .............. | 348/240.99 |

FOREIGN PATENT DOCUMENTS

| JP | 2002-50885 | A | 3/2002 |
| JP | 2007-3819 | A | 1/2007 |
| JP | 2008-20799 | A | 1/2008 |
| KR | 10-0740147 | B1 | 7/2007 |

OTHER PUBLICATIONS

Akazawa, H. et. al. "Electro-optic of c-axis oriented LiNbO3 films grown on Si(1 0 0) substrate", Material Science and Engineering B, vol. 120, 2005, pp. 50-54.
Fujiura, K et. al. "KTN Optical Waveguide Technologies with a Large Electro-Optic Effect", Pacific Rim Conference on Lasers and Electro-Optics 2005, Aug. 2005, pp. 69-70.
Lee, H. T. et. al. "Growth and characteristics of Zn:LiNbO3/Mg:LiNbO3 multilayer thin films grown by liquid phase epitaxy", Crys. Res. Technol. vol. 41, No. 9, 2006, pp. 848-852.

* cited by examiner

Primary Examiner — Loha Ben
(74) Attorney, Agent, or Firm — Sughrue Mion, PLLC

(57) ABSTRACT

An optical image shutter is disclosed. The optical image shutter includes an optical filter having a fixed refractive index and an optical filter having a variable refractive index. The optical filter having a fixed refractive index may include two layers having different refractive indexes and stacked alternately at least once. Alternatively, the optical filter having a variable refractive index may include at least one refractive index variable layer, and two layers having different refractive indexes and stacked alternately at least once. The optical image shutter may further include a transparent electrode for applying an electric field to the at least one refractive index variable layer.

12 Claims, 18 Drawing Sheets

OPTICAL IMAGE SHUTTER

CROSS-REFERENCE TO RELATED PATENT APPLICATION

This application claims the benefit of Korean Patent Application No. 10-2009-0004198, filed on Jan. 19, 2009, in the Korean Intellectual Property Office, the disclosure of which is incorporated herein in its entirety by reference.

BACKGROUND

1. Field

One or more embodiments of the present invention relate to an optical device, and more particularly, to an optical image shutter.

2. Description of the Related Art

Optical image shutters transmit or block an optical image containing information according to a control signal. Optical shutters are essential optical modules widely used in image pickup devices, such as cameras, and display devices, such as liquid crystal displays (LCDs).

Optical shutters may be technically classified into a mechanical shutter used in a camera or the like, a liquid crystal shutter used in an LCD, a digital micromirror device used in a projection display device, a micro-electro-mechanical system (MEMS)-based spatial light modulator such as a grating light-valve, an intensifier used in a laser radar (LADAR) or a three-dimensional (3D) camera, and a semiconductor-based optical shutter.

In terms of working principles and shutter speeds, a mechanical shutter drives a lens shade by using an electromagnetic motor and has a shutter time of 1 millisecond (ms) or so. A liquid crystal shutter is driven by the rotation of liquid crystal molecules and has a shutter time of several milliseconds. A MEMS-based spatial light modulator drives a fine structure with an electrostatic force and has an operation time of tens of microseconds (μs). An intensifier used in a 3D camera and a semiconductor-based optical shutter are driven by the photoelectric conversion of a semiconductor and have a shutter time of several nanoseconds (ns).

Light modulation devices rely on electro-optical effect in which a refractive index varies according to an electric field. Examples of light modulation devices relying on electro-optical effect include a Kerr cell using Kerr effect and a Pockel cell using Pockel effect.

However, Kerr cells and Pockel cells relying on electro-optical effect often use a bulk electro-optical crystal that requires a driving voltage of thousands of volts in order to obtain desired effect.

SUMMARY

One or more embodiments of the present invention provide an optical image shutter that may reduce a driving voltage.

According to an aspect of the present invention, there is provided an optical image shutter including: a first optical filter having a fixed refractive index; and a second optical filter having a variable refractive index.

The first optical filter may include a first layer having a first refractive index and a second layer having a second refractive index that is different from the first refractive index, and the first and second layers may be stacked alternately at least once.

The second optical filter may include at least one refractive index variable layer. The second optical filter may further include two layers having different refractive indexes and stacked alternately at least once.

The optical image shutter may further include a transparent electrode for applying an electric field to the at least one refractive index variable layer.

The first and second optical filters may be separated from each other or coupled to each other.

The refractive index variable layer may be a material layer having electro-optical effect.

If the first and second optical filters are separated from each other, the first and second optical filters may be arranged on the same optical axis in such a manner that the first and second optical filters are disposed parallel to each other or one of the first and second optical filters is inclined with respect to the remaining optical filter.

The optical image shutter may further include an optical element disposed between the first and second optical filters.

Accordingly, since the optical image shutter uses an electro-optical material that is bar-shaped, the optical image shutter may increase an electric field applied to both ends of the optical image shutter, thereby lowering a driving voltage of the optical image shutter to a voltage of hundreds of volts, for example, a voltage less than 200 V.

Since the optical image shutter uses not only a passive film but also an active film whose optical characteristics may be controlled, the optical image shutter may be applied to a wider range of devices, and may obtain a higher quality image and more exact measurement results.

Since a response time of the electro-optical material indicating electro-optical effect is less than 1 nanosecond (ns), the optical image shutter may operate at high speed. Accordingly, the optical image shutter may be applied to a device requiring a high speed shutter, e.g., a high speed camera or a high speed display device, as well as a three-dimensional (3D) camera.

Since the optical image shutter is formed as a thin film on a transparent substrate, the thickness is less than 100 μm-1 mm when including the transparent substrate, and is less than 100 μm when not including the transparent substrate, thereby reducing the size of the optical image shutter, maintaining an incident image intact, and preventing a decrease in resolution.

Since an existing optical filter manufacturing method whose stability has been verified is used to manufacture the optical image shutter, the optical image shutter may be easily manufactured and commercialized. Since the optical image shutter may be made large, the optical image shutter may be applied to a shutter for a camera and a flat panel display device.

If the optical image shutter is applied to a display device, the optical image shutter may be set as a unit pixel, a plurality of the optical image shutters may be arranged to form an array, and the optical image shutters may be individually driven, thereby making it possible to display an image of the display device according to time.

BRIEF DESCRIPTION OF THE DRAWINGS

The above and other features and advantages of embodiments of the present invention will become more apparent by describing in detail exemplary embodiments thereof with reference to the attached drawings in which.

DETAILED DESCRIPTION OF THE INVENTION

Figure 1:
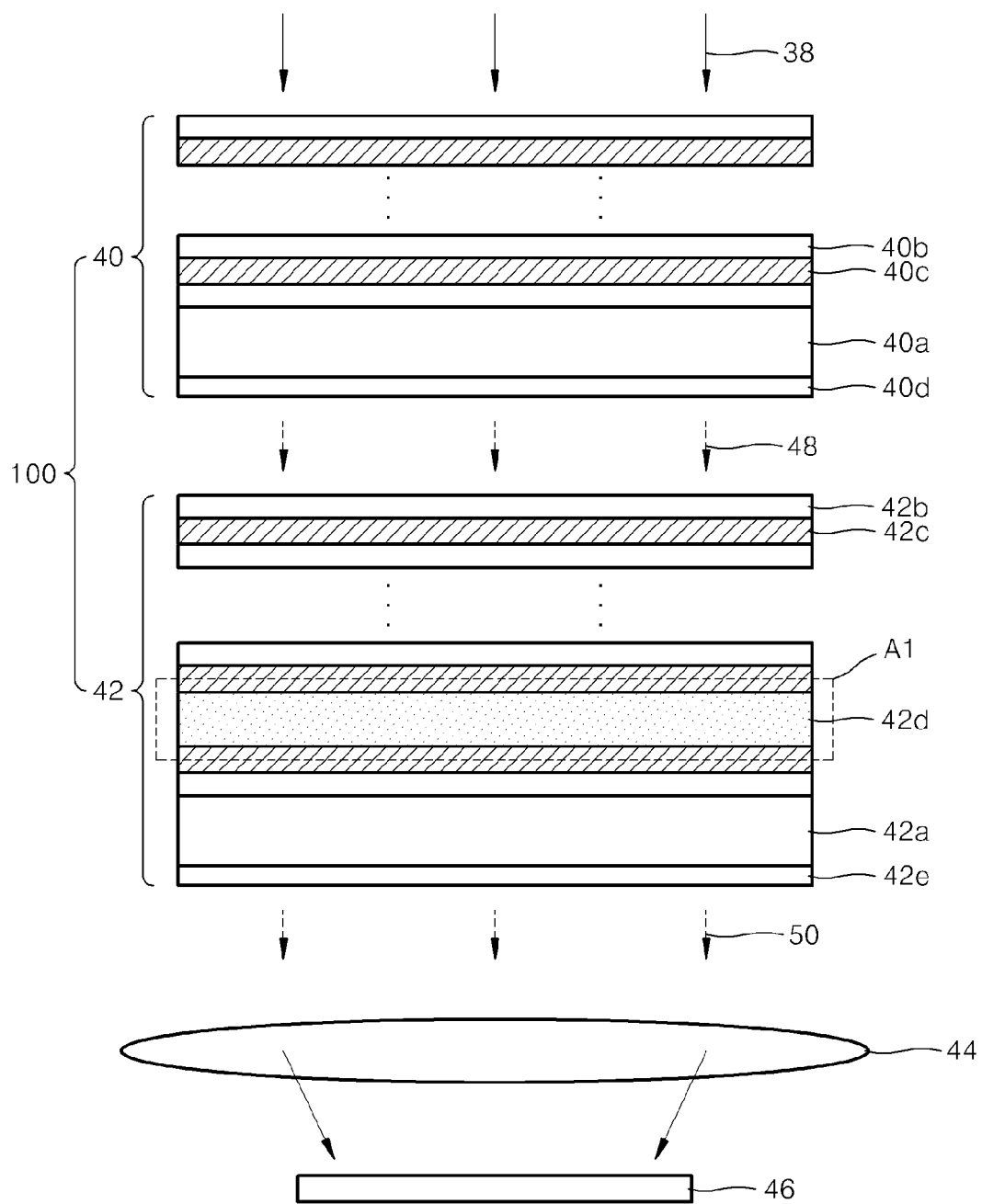
FIG. 1 is a cross-sectional view of an optical image shutter according to an embodiment of the present invention.

One or more embodiments of the present invention will now be described more fully with reference to the accompanying drawings, in which exemplary embodiments of the invention are shown. The thicknesses of layers or regions illustrated in the drawings are exaggerated for clarity.

FIG. 1 is a cross-sectional view of an optical image shutter (referred to as an optical shutter) 100 according to an embodiment of the present invention. Referring to FIG. 1, the optical shutter 100 includes a passive filter 40 and an active filter 42. The passive filter 40 may be an optical filter having a fixed refractive index. The active filter 42 may be an optical filter having a variable refractive index. Incident light 38 incident on the passive filter 40 sequentially passes through the passive filter 40 and the active filter 42. The incident light 38 may be first incident on the active filter 42 if the passive filter 40 changes places with the active filter 42. Light 50 passing through the active filter 42 passes through a relay lens set 44 and is focused on an optical image sensor 46. The relay lens set 44 is designed to focus light on the optical image sensor 46. If a camera optical system disposed in front of the passive filter 40 is designed to focus light on the optical image sensor 46, the relay lens set 44 may be omitted. The passive filter 40 and the active filter 42 are disposed on the same optical axis. The passive filter 40 and the active filter 42 are spaced apart from each other. Another optical element may be disposed between the passive filter 40 and the active filter 42. For example, a reflective mirror for changing the path of light 48 passing through the passive filter 40 or a beam splitter for splitting the light 48 passing through the passive filter 40 into a plurality of beams may be disposed between the passive filter 40 and the active filter 42. The passive filter 40 and the active filter 42 may be integrated as a single body as will be explained later.

The passive filter 40 includes a first substrate 40a, and thin films stacked on the first substrate 40a. The first substrate 40a may be a transparent substrate, for example, a glass substrate or a polymer substrate. A rear surface of the first substrate 40a facing the active filter 42 may be covered by a first anti-reflection layer 40d. The first anti-reflection layer 40d may be optional. A first layer 40b having a first refractive index and a second layer 40c having a second refractive index may be alternately stacked on the first substrate 40a. The first refractive index may be greater or less than the second refractive index. A layer of the passive filter 40 through which the incident light 38 first passes may be the first layer 40b. For example, the first layer 40b may be a magnesium fluoride layer. For example, the second layer 40c may be a zinc sulfide layer. The first layer 40b may have a thickness of $\lambda_1/4$. Here, $\lambda_1$ is defined by $\lambda_c/n1$, where $\lambda_c$ is a threshold wavelength or a center wavelength of the incident light 38 and n1 is a refractive index, that is, the first index, of the first layer 40b. For example, the center wavelength $\lambda_c$ may be 850 nm, but the present embodiment is not limited thereto, and the center wavelength $\lambda_c$ may be greater or less than 850 nm. The second layer 40c may have a thickness of $\lambda_2/4$. Here, $\lambda_2$ is defined by $\lambda_c/n2$, where n2 is a refractive index, that is, the second refractive index, of the second layer 40c. The thickness of one selected from a plurality of the second layers 40c stacked on the first substrate 40 may be greater than the thickness of each of the remaining second layers 40c. For example, the thickness of the selected second layer 40c may be $(\lambda_2)/2$.

The active filter 42 includes a second substrate 42a facing the relay lens set 44. The second substrate 42a may be a transparent substrate. A rear surface of the second substrate 42 facing the relay lens set 44 may be covered by a second anti-reflection layer 42e. The second anti-reflection layer 42e may be formed of the same material as the first anti-reflection layer 40d. The active filter 42 may include a third layer 42b having a third refractive index and a fourth layer 42c having a fourth refractive index alternately stacked on the second substrate 42a. The third layer 42b may be formed of the same material as the first layer 40b. The fourth layer 42c may be formed of the same material as the second layer 40c. Accordingly, the thickness of the third layer 42b may be the same as that of the first layer 40b, and the thickness of the fourth layer 42c may be the same as that of the second layer 40c. A layer of the active filter 42 through which the light 48 passing through the passive filter 40 first passes may be the third layer 42b. The active filter 42 may further include an active layer 42d disposed between the fourth layers 42c. The active layer 42d may include a material layer whose refractive index varies due to an external influence.

Figure 2:
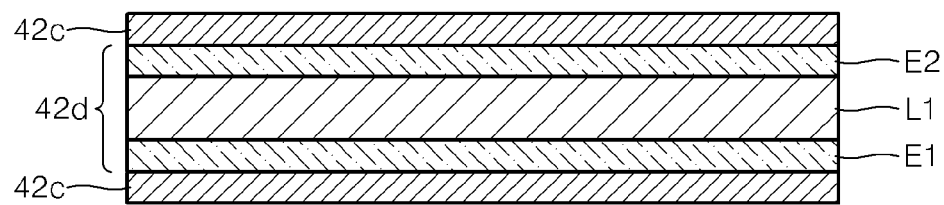
FIGS. 2 and 3 are enlarged cross-sectional views illustrating an area A1 of an active filter of the optical image shutter of FIG. 1.
Figure 3:
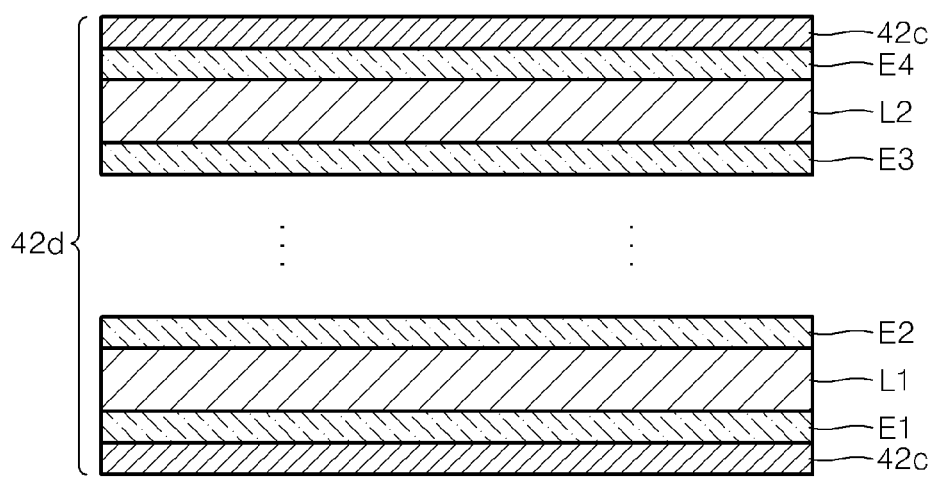

FIGS. 2 and 3 are enlarged cross-sectional views illustrating an area A1 including the active layer 42d of the active filter 42 of the optical shutter 100 of FIG. 1.

Referring to FIG. 2, the active layer 42d includes first and second transparent electrodes E1 and E2, and a first refractive index variable layer L1 disposed between the first and second transparent electrodes E1 and E2. For example, the first refractive index variable layer L1 whose refractive index varies due to electro-optical effect may be a $LiNbO_3$ layer or a KTN layer.

The first and second transparent electrodes E1 and E2 may be any transparent electrodes that may be used in an optical device or a display device. For example, the first and second transparent electrodes E1 and E2 may be indium tin oxide (ITO) electrodes. Since the first refractive index variable layer L1 has a refractive index varying due to electro-optical effect, the first and second transparent electrodes E1 and E2 may be spaced apart from the first refractive index variable layer L1. Accordingly, the first transparent electrode E1 may be disposed on the first layer of the active filter 42, or may be disposed between the first layer of the active filter 42 and the first refractive index variable layer L1. The second transparent electrode E2 may be a lowermost layer of the active layer 42, or may be disposed between the lowermost layer of the active filter 42 and the first refractive index variable layer L1. An electric field may be applied to the first refractive index variable layer L1 by applying a voltage to the first and second transparent electrodes E1 and E2 which may be disposed in various places as described above. Alternatively, an electric field may be applied to the first refractive index variable layer L1 from an external unit outside the active filter 42 or outside the optical shutter 100 without using the first and second transparent electrodes E1 and E2. The first refractive index variable layer L1 may have a thickness of λ/1. Here, A is defined by $\lambda_c/nL1$, where nL1 is a refractive index of the first refractive index variable layer L1.

The active layer 42d of the optical shutter 100 of FIG. 1 may include a plurality of refractive index variable layers as shown in FIG. 3.

Referring to FIG. 3, the active layer 42d may further include a second refractive index variable layer L2 that is spaced apart from the first refractive index variable layer L1. The second refractive index variable layer L2 may have a thickness of λ/1. Here, A is defined by $\lambda_c/nL2$, where nL2 is a refractive index of the second refractive index variable layer L2. The refractive index nL2 of the second refractive index variable layer L2 may vary based on the same principle as that based on which the refractive index nL1 of the first refractive index variable layer L1 varies. However, the second refractive index variable layer L2 may be formed of a material that is different from that of the first refractive index variable layer L1. The refractive index of the second refractive index variable layer L2 may vary due to an electric field generated by a voltage applied to third and fourth transparent electrodes E3 and E4. A relationship between the first and second transparent electrodes E1 and E2 and the first refractive index variable layer L1 may be the same as a relationship between the third and fourth transparent electrodes E3 and E4 and the second refractive index variable layer L2. In FIG. 3, at least one dielectric layer having a predetermined refractive index may be disposed between the second transparent electrode E2 and the third transparent electrode E3. For example, one third layer 42b or one fourth layer 42c, or both of them may be disposed between the second and third transparent electrodes E2 and E3. The active layer 42d of FIG. 3 may further include one or more refractive index variable layers in addition to the first and second refractive index variable layers L1 and L2.

Although the active layer 42d may include the first and second refractive index variable layers L1 and L2 in FIG. 3, the present embodiment is not limited thereto, and the active layer 42d illustrated in FIG. 2 may further include a refractive index variable layer between the first and second transparent electrodes E1 and E2. That is, the first and second transparent electrodes E1 and E2 may be shared by at least two refractive index variable layers. At this time, the at least two refractive index variable layers may be spaced apart from one another.

A relationship between the intensity of light incident on the optical shutter 100 and the intensity of light passing through the optical shutter will now be explained below.

If the intensity of the incident light 38 incident on the passive filter 40 of the optical shutter 100 of FIG. 1 is E0, the intensity Et of the light 48 passing through the passive filter 40 satisfies Et=T(λ)E0, where T(λ) is a transmittance or a transfer function of the passive filter 40. The intensity Et of the light 48 passing through the passive filter 40 is the intensity of light incident on the active filter 40. The intensity Et" of the light 50 passing through the active filter 42 satisfies Et"=T'(λ, V)Et, where T'(λ, V) is a transmittance or a transfer function of the active filter 42 and V is a voltage applied to the active filter 42. Since Et=T(λ)E0, the intensity Et" of the light 50 passing through the active filter 42 is defined by $$Et" = T'(\lambda, V)T(\lambda)E0 = T"(\lambda, V)E0. \qquad [\text{Equation 1}]$$

Equation 1 shows a relationship between the intensity E0 of the incident light 38 incident on the optical shutter 100 and the intensity Et" of the light 50 passing through the optical shutter 100. In Equation 1, T"(λ, V) is a transfer function of the optical shutter 100 that is obtained by multiplying the transfer function T(λ) of the passive filter 40 by the transfer function T'(λ, V) of the active filter 42. If the optical shutter 100 includes another optical element disposed between the passive filter 40 and the active filter 42, the transfer function of the optical shutter 100 may be obtained by multiplying the transfer function of the passive filter 40 by a transfer function of the another optical element by the transfer function of the active filter 42.

The passive filter 40 of the optical shutter 100 of FIG. 1 may be any filter having transmission and reflection characteristics selected from the group consisting of a low-pass filter, a high-pass filter, a band-pass filter, a monochromatic filter, a notch filter, a shaping filter, and Fabry-Pero interference filter.

Figure 4:
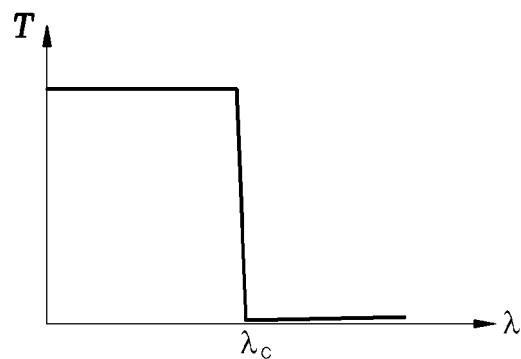
FIGS. 4 through 9 are graphs illustrating transfer functions of a passive filter of the optical image shutter of FIG. 1.

FIG. 4 is a graph illustrating a transfer function of the passive filter when the passive filter 40 is a low-pass filter.

Figure 5:
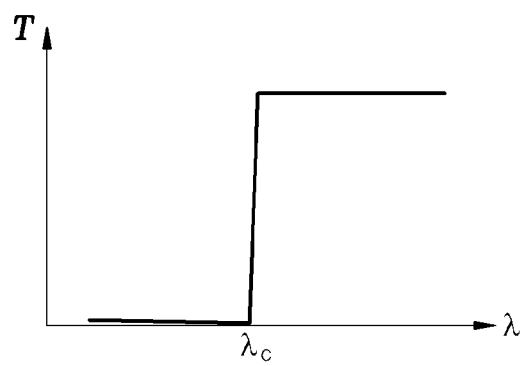

FIG. 5 is a graph illustrating a transfer function of the passive filter 40 when the passive filter 40 is a high-pass filter.

Figure 6:
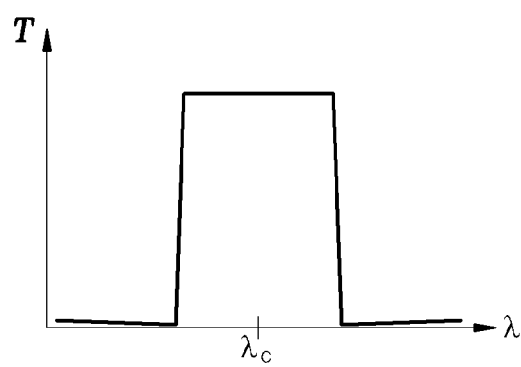

FIG. 6 is a graph illustrating a transfer function of the passive filter 40 when the passive filter 40 is a band-pass filter.

Figure 7:
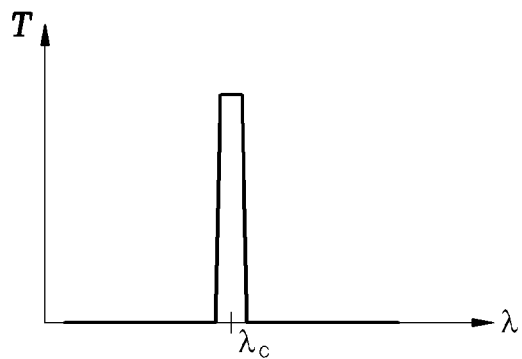

FIG. 7 is a graph illustrating a transfer function of the passive filter 40 when the passive filter 40 is a monochromatic filter.

Figure 8:
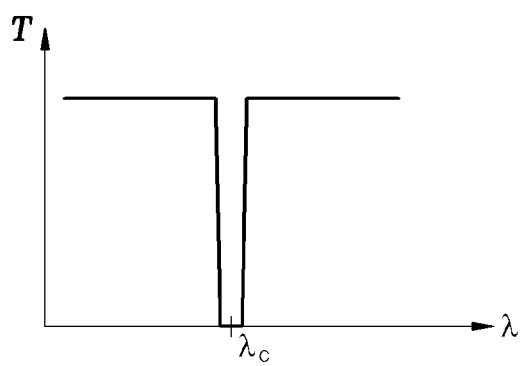

FIG. 8 is a graph illustrating a transfer function of the passive filter 40 when the passive filter 40 is a notch filter.

Figure 9:
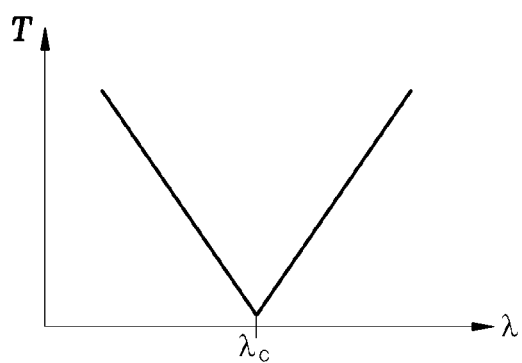

FIG. 9 is a graph illustrating a transfer function of the passive filter 40 when the passive filter 40 is a shaping filter.

FIGS. 4 through 9 illustrate transmittances or reflectances of the passive filter 40 when the passive filter 40 is the above filters.

Since the active filter 42 includes the active layer 42d, a center wavelength or a transmission threshold wavelength of the active filter 42 may vary due to an external influence, for example, an electric field generated by an external voltage. In other words, the active filter 42 may be a filter having a transfer function that varies according to an external influence. Accordingly, the active filter 42 is a filter having variable characteristics (referred to as a variable filter). The active filter 42 having transmission or reflection characteristics may be a variable low-pass filter. Alternatively, the active filter 42 having transmission or reflection characteristics may be a variable high-pass filter, a variable band-pass filter, a variable monochromatic filter, a variable notch filter, a variable shaping filter, or a variable Fabry-Perot interference filter.

FIGS. 10 through 15 are graphs illustrating transfer functions, that is, transmission characteristics, of various variable filters that may be used as the active filter 42.

Figure 10:
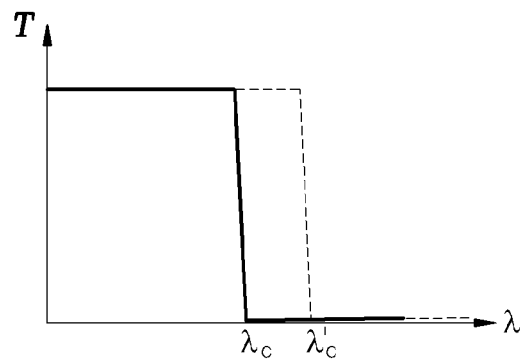
FIGS. 10 through 15 are graphs illustrating transfer functions of the active filter of the optical image shutter of FIG. 1.

FIG. 10 is a graph illustrating a transfer function of the active filter 42 when the active filter 42 is the variable low-pass filter.

Figure 11:
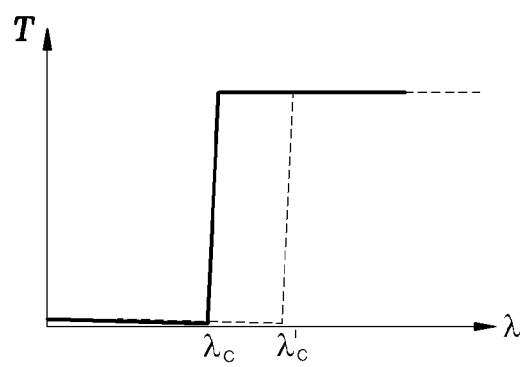

FIG. 11 is a graph illustrating a transfer function of the active filter 42 when the active filter 42 is a variable high-pass filter.

Figure 12:
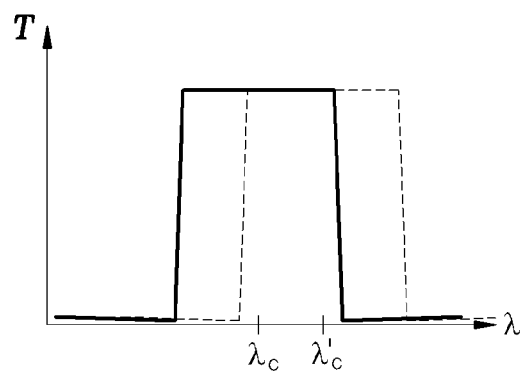

FIG. 12 is a graph illustrating a transfer function of the active filter 42 when the active filter 42 is a variable band-pass filter.

Figure 13:
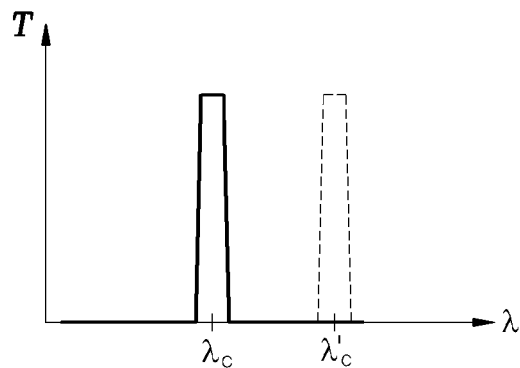

FIG. 13 is a graph illustrating a transfer function of the active filter 42 when the active filter 42 is a variable monochromatic filter.

Figure 14:
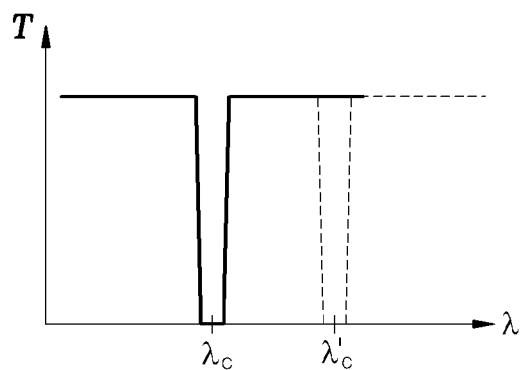

FIG. 14 is a graph illustrating a transfer function of the active filter 42 when the active filter 42 is a variable notch filter.

Figure 15:
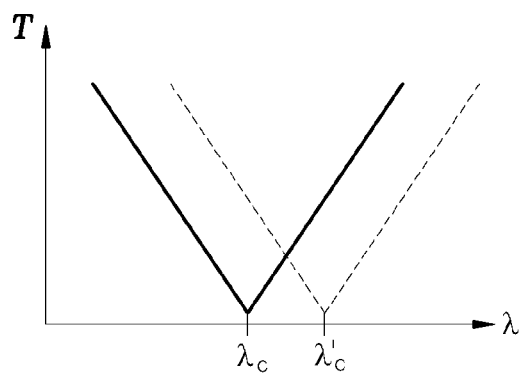

FIG. 15 is a graph illustrating a transfer function of the active filter 42 when the active filter 42 is a variable shaping filter.

In FIGS. 10 through 15, a solid line represents a transfer function, that is, transmission characteristics, of the active filter 42 when there is no external influence, and a dotted line represents a transfer function when there is an external influence, such as an electric field, on the active filter 42. The electric field may be applied from an external unit outside the active filter 42, or may be applied by applying a voltage to the transparent electrodes E1 through E4 included in the active filter 42.

Referring to FIGS. 10 through 15, when there is an external influence on the active filter 42, a center wavelength or a threshold wavelength of a transfer function is shifted to the right.

A transfer function of the optical shutter 100 will now be explained.

As shown in Equation 1, the transfer function $T''(\lambda, V)$ of the optical shutter 100 is obtained by multiplying the transfer function $T(\lambda)$ of the passive filter 40 by the transfer function $T'(\lambda, V)$ of the active filter 42. FIGS. 16 through 19 are graphs illustrating the transfer function $T''(\lambda, V)$ of the optical shutter 100 when the passive filter 40 and the active filter 42 are various filters.

Figure 16:
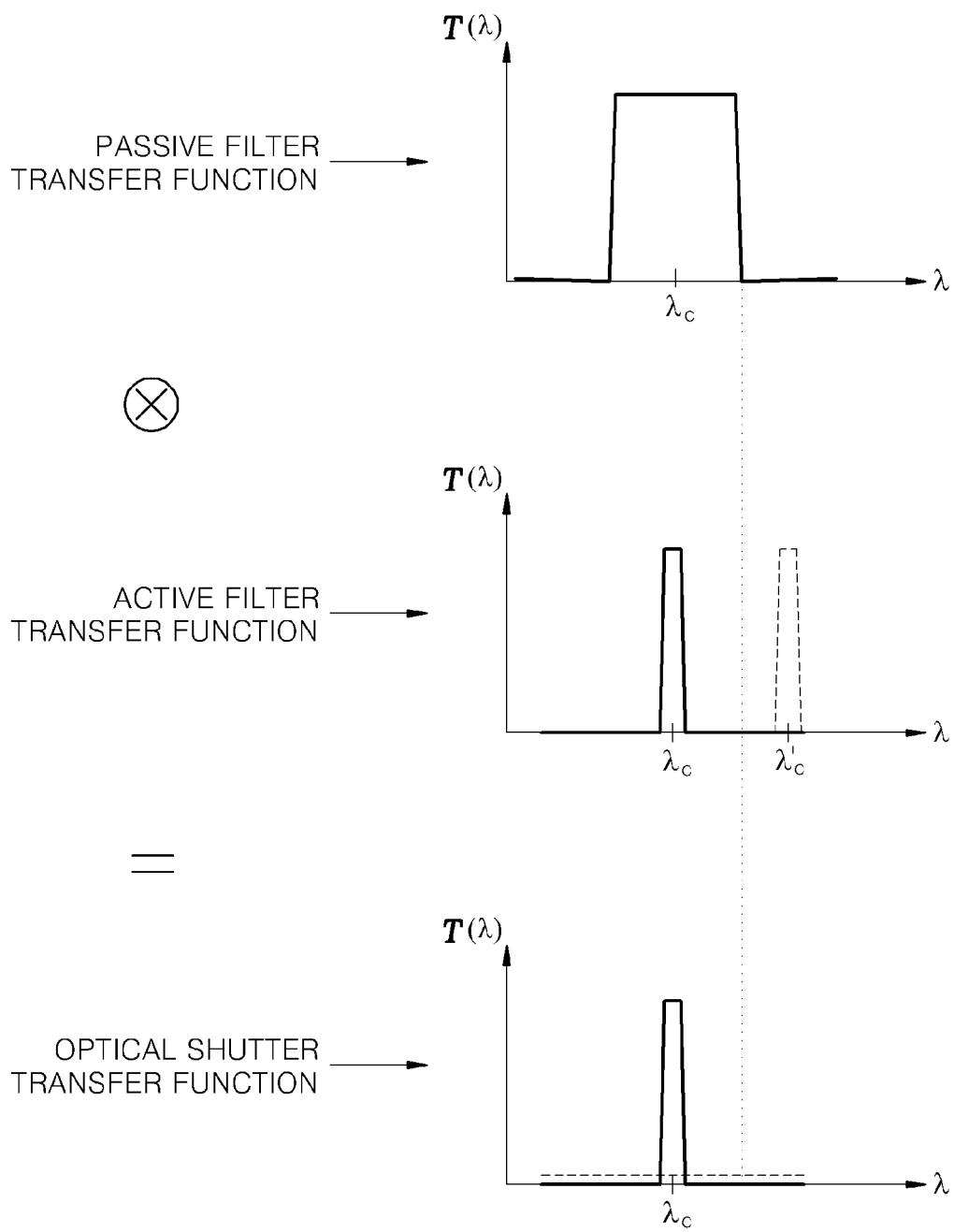
FIGS. 16 through 19 are graphs illustrating transfer functions of the optical image shutter of FIG. 1 including various passive and active filters.

FIG. 16 is a graph illustrating the transfer function $T''(\lambda, V)$ of the optical shutter 100 when the passive filter 40 is a band-pass filter and the active filter 42 is a variable monochromatic filter. In FIG. 16, a solid line represents a transmittance of the optical shutter 100 when the optical shutter 100 is opened, that is, when no voltage is applied to the active filter 42, and a dotted line represents a transmittance of the optical shutter 100 when the optical shutter 100 is closed, that is, when a voltage applied to the active filter 42. The same explanation of the solid line and the dotted line of FIG. 16 may be given for those in FIGS. 17 and 19.

Referring to FIG. 16, when the optical shutter 100 is opened, the transfer function $T''(\lambda, V)$, that is, a transmittance, of the optical shutter 100 follows the transfer function $T'(\lambda, V)$ of the active filter 42. When the optical shutter 100 is closed, the transmittance of the optical shutter 100 is so small that it is determined that light the incident light 38 incident on the optical shutter 100 is blocked by the optical shutter 100.

Figure 17:
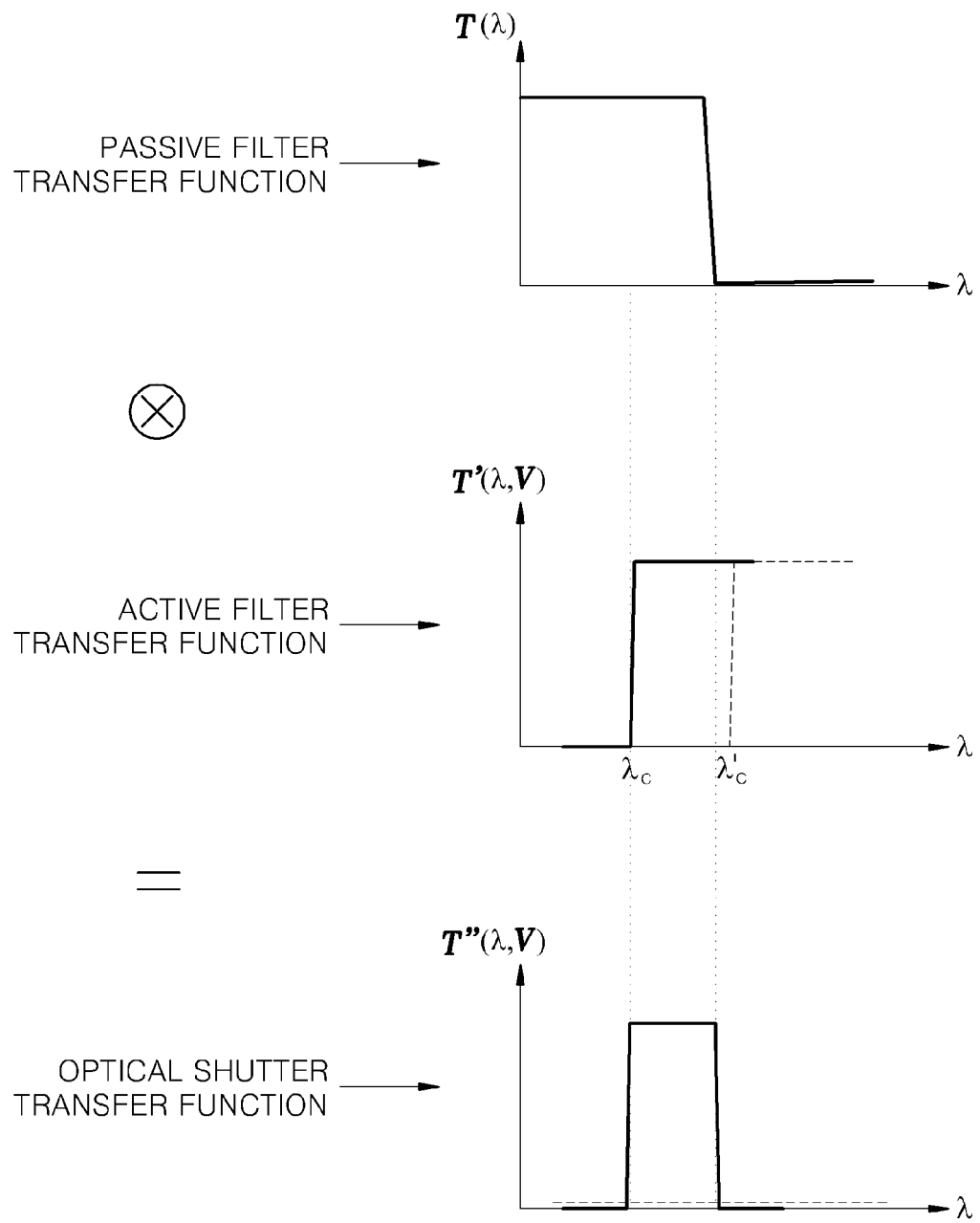

FIG. 17 is a graph illustrating the transfer function $T''(\lambda, V)$ of the optical shutter 100 when the passive filter 40 is a low-pass filter having a transmission maximum threshold wavelength of $\lambda'_c$ and the active filter 42 is a variable high-pass filter having a transmission minimum threshold wavelength of $\lambda_c (<\lambda'_c)$.

Referring to FIG. 17, when the optical shutter 100 is opened, the transfer function $T''(\lambda, V)$ of the optical shutter 100 shows transmission characteristics of a band-pass filter. When the optical shutter 100 is closed, the transmittance is so small that it is negligible.

Figure 18:
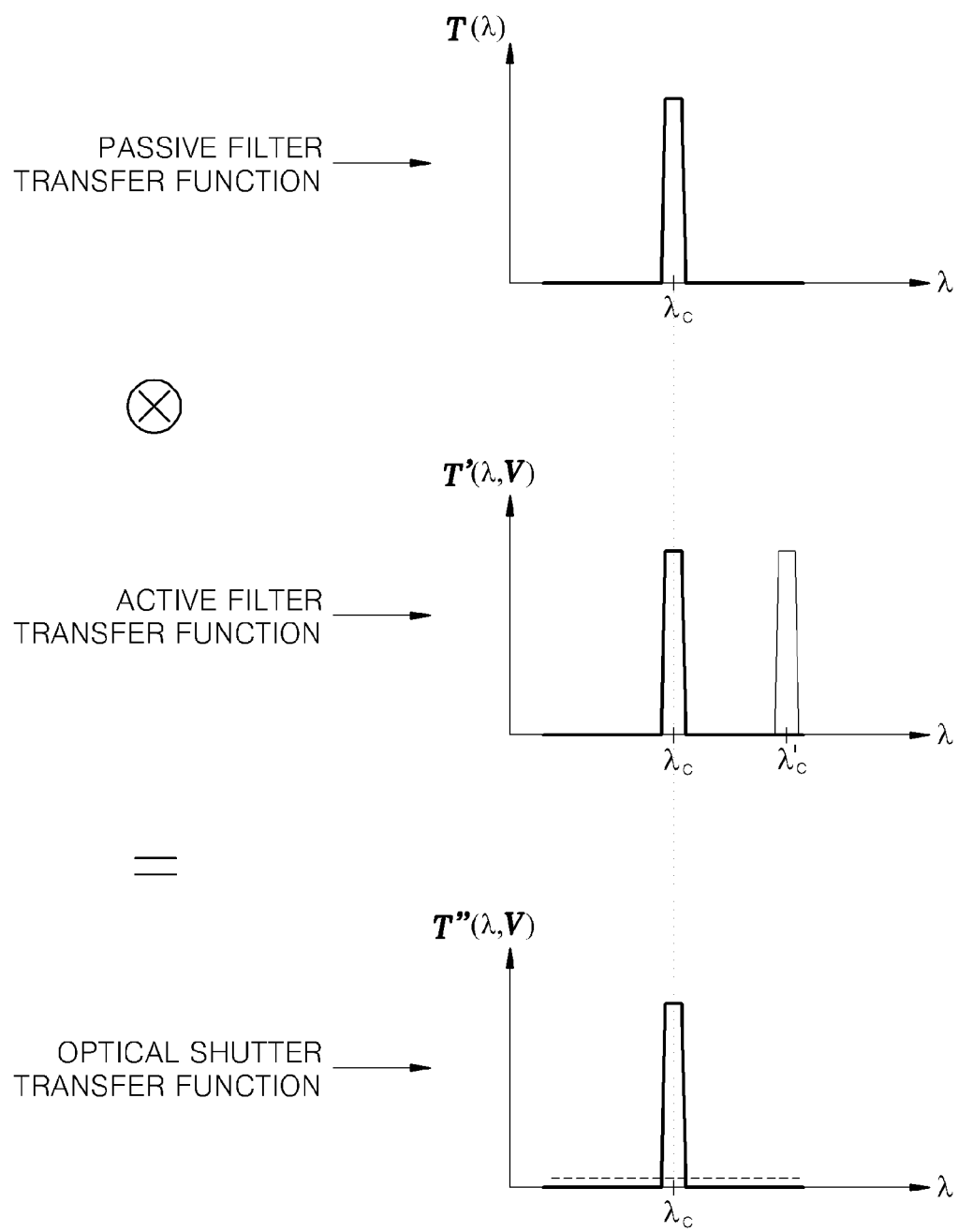

FIG. 18 is a graph illustrating the transfer function $T''(\lambda, V)$ of the optical shutter 100 when the passive filter 40 is a monochromatic filter and the active filter 42 is a variable monochromatic filter whose center wavelength when no voltage is applied is the same as that of a monochromatic filter.

Figure 19:
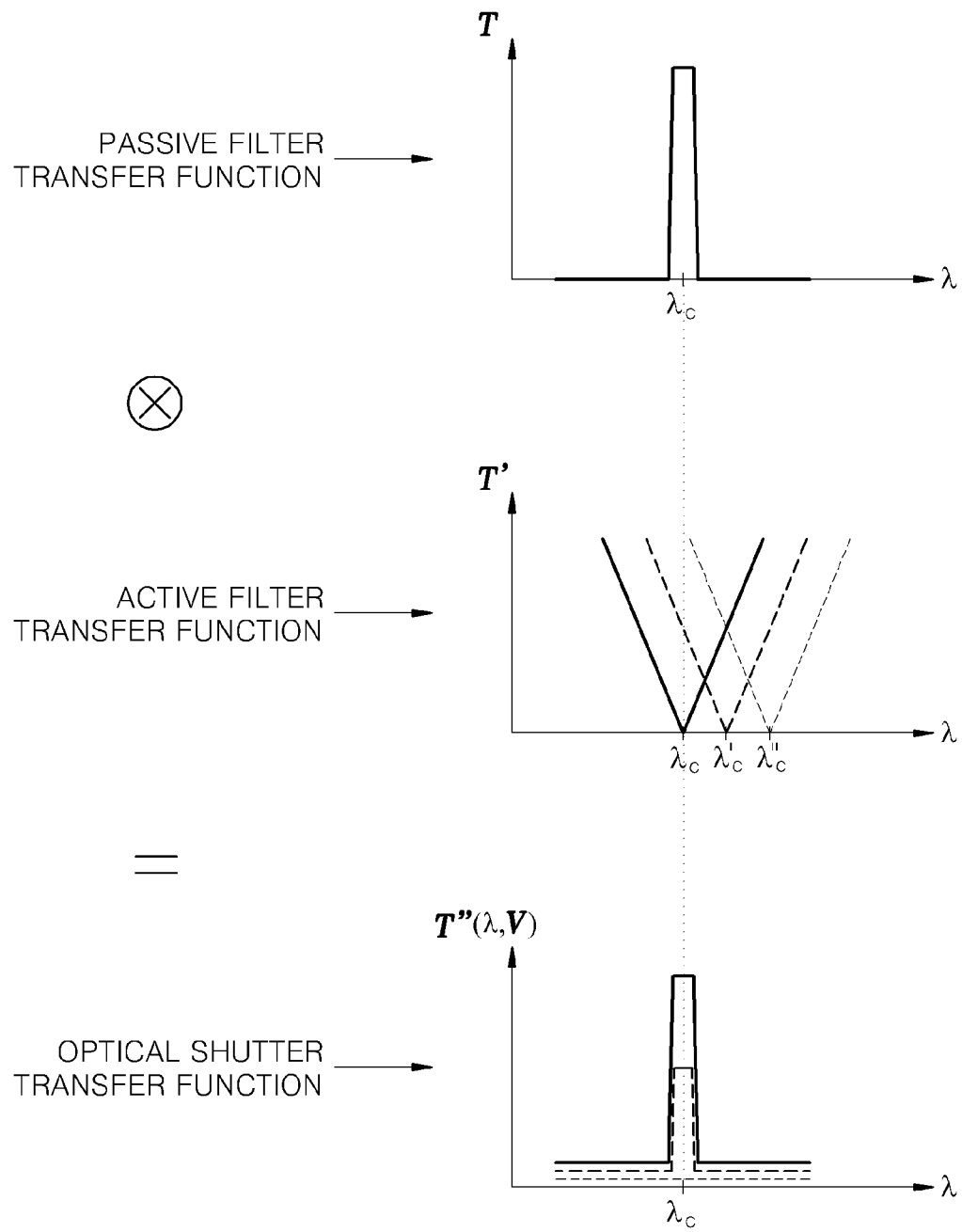

Referring to FIG. 19, when the optical shutter 100 is opened, that is, when no voltage is applied to the active filter 42, the optical shutter 100 has the same characteristics as the passive filter 40. When the optical shutter 100 is closed, that is, when a voltage is applied to the active filter 42, the transmittance of the optical shutter 100 is so small that it is negligible.

FIG. 19 is a graph illustrating the transfer function $T''(\lambda, V)$ of the optical shutter 100 when the passive filter 40 is a monochromatic filter and the active filter 42 is a shaping filter. In FIG. 19, a first graph G1 illustrates the transfer function, that is, the transmittance, of the active filter 42 when no voltage is applied to the active filter 42, a second graph G2 illustrates the transfer function of the active filter 42 when a first voltage V1 is applied to the active filter 42 so that the active filter 42 has full transmission characteristics for the passive filter 40 (referred to as a second case), and a third graph G3 illustrates the transfer function of the active filter 42 when a second voltage V2 is applied to the active filter 42 so that the active filter 42 has half transmission characteristics for the passive filter 40 (referred to as a third case). The second voltage V2 is less than the first voltage V1.

In FIG. 19, a first graph G11 illustrates the transmittance of the optical shutter 100 in the first case, a second graph G22 illustrates the transmittance of the optical shutter 100 in the second case, and a third graph G33 illustrates the transmittance of the optical shutter in the third case.

Referring to FIG. 19, in the first case, the center wavelength $\lambda_c$ of the passive filter 40 coincides with a center wavelength of a stop-band of the active filter 42. Accordingly, in the first case, the optical shutter 100 is closed, and the transmittance of the optical shutter 100 is so small that it is negligible as shown in the first graph G11. In the second case, the optical shutter 100 is completely opened, and the transmittance of the optical shutter 100 follows the transmittance of the passive filter 40. In the third case, as shown in the third graph G33, the transmittance of the optical shutter 100 is less than that of the second case and is greater than that of the first case. That is, the optical shutter 100 has half transmission characteristics. Accordingly, it may be found from results of FIG. 19 that if the passive filter 40 and the active filter 42 are configured in such a manner as shown in FIG. 19 and a voltage applied to the active filter 42 is continuously changed, the transfer function $T''(\lambda, V)$, that is, the transmittance, of the optical shutter 100 continuously varies according to the voltage applied to the active filter 42.

Figure 20:
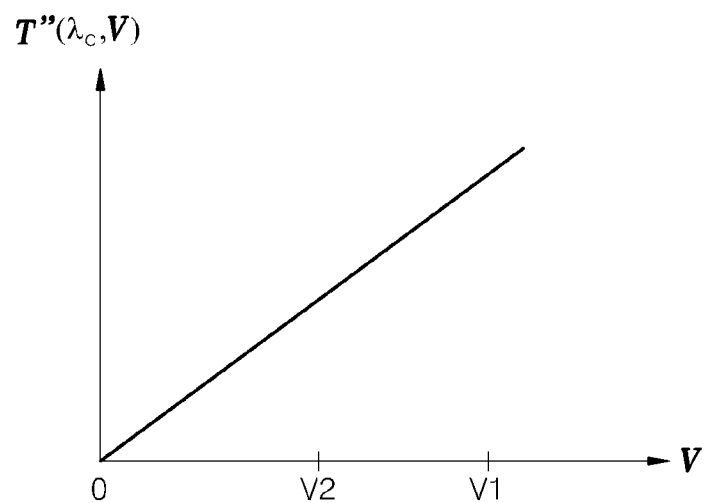
FIG. 20 is a graph illustrating a relationship between a voltage applied to the active filter and a transmittance of the optical image shutter at a center wavelength, which is the transfer function of the optical image shutter of FIG. 19.

FIG. 20 is a graph illustrating a relationship between a voltage V applied to the active filter 42 and the transmittance of the optical shutter 100 at the center wavelength $\lambda_c$, which is the transfer function of the optical shutter 100 of FIG. 19.

Referring to FIG. 20, the transmittance at the center wavelength $\lambda_c$ is continuously changed according to the voltage V applied to the active filter 42. Accordingly, if the optical shutter 100 includes the active filter 42 and the passive filter 40 having the transfer functions illustrated in FIG. 19, the optical shutter 100 may be used as a modulator that passes the incident light 38 at a desired ratio.

Although the transfer functions, that is, the transmittances, of the active filters are shifted to the right as a voltage is applied thereto in FIG. 19, since the refractive index of the active layer 42d may be reduced according to a method of applying a voltage or the crystal orientation of an electro-optical material, the transmittances of the active filters may be shifted to the left. Accordingly, an on-state or an off-state of the optical shutter 100 according a voltage applied to the active filer 42 may be set reversely.

Although the on-state and the off-state of the optical shutter 100 may be controlled by adjusting an applied voltage, the optical shutter 100 may not always be in an off-state or an off-state when a voltage is applied. For example, when a voltage is applied, the optical shutter 100 may be in an intermediate state between the on-state and the off-state.

The passive filter 40 and the active filter 42 may be variously disposed according to whether the passive filter 40 and the active filter 42 have transmission characteristics or reflection characteristics which will be explained with reference to FIGS. 21 through 26.

Figure 21:
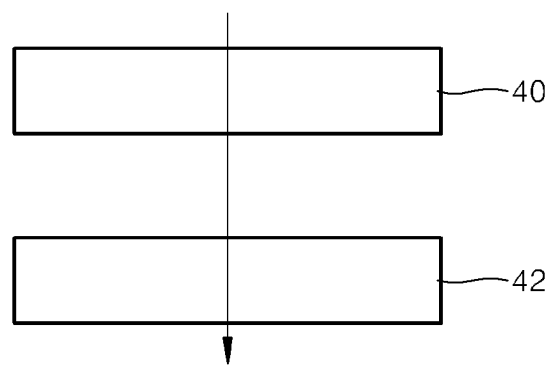
FIGS. 21 through 26 are cross-sectional views illustrating various arrangements of the passive filter and the active filter included in the optical image shutter of FIG. 1.

FIG. 21 is a cross-sectional view illustrating that the passive filter 40 and the active filter 42 are arranged in parallel on the same optical axis. In FIG. 21, the passive filter 40 and the active filter 42 have transmission characteristics. A transmission band of the active filter 42 may overlap with at least a part of a transmission band of the passive filter 40 when the active filter 42 is in an on-state or an off-state.

Figure 22:
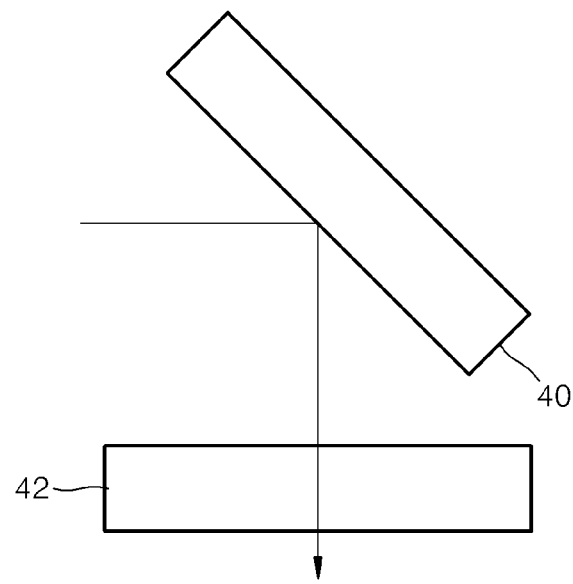

FIG. 22 is a cross-sectional view illustrating that the passive filter 40 and the active filter 42 are arranged on the same axis and the passive filter 40 is inclined with respect to the active filter 42. In FIG. 22, the passive filter 40 has reflection characteristics, and the active filter 42 has transmission characteristics. When the active filter 42 is in an on-state or an off-state, a transmission band of the active filter 42 may overlap with at least a part of a reflection band of the passive filter 40.

Figure 23:
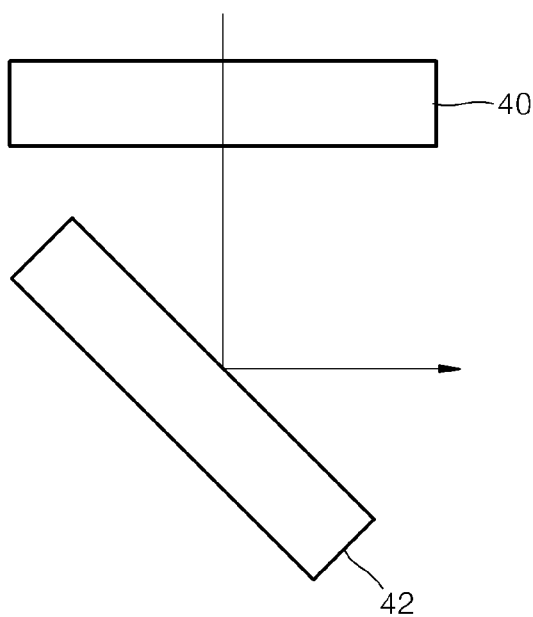

FIG. 23 is a cross-sectional view illustrating that the passive filter 40 and the active filter 42 are arranged on the same optical axis and the active filter 42 is inclined with respect to the passive filter 40. In FIG. 23, the passive filter 40 has transmission characteristics and the active filter 42 has reflection characteristics. When the active filter 42 is in an on-state or an off-state, a reflection band of the active filter 42 may overlap with at least a part of a transmission band of the passive filter 40.

Figure 24:
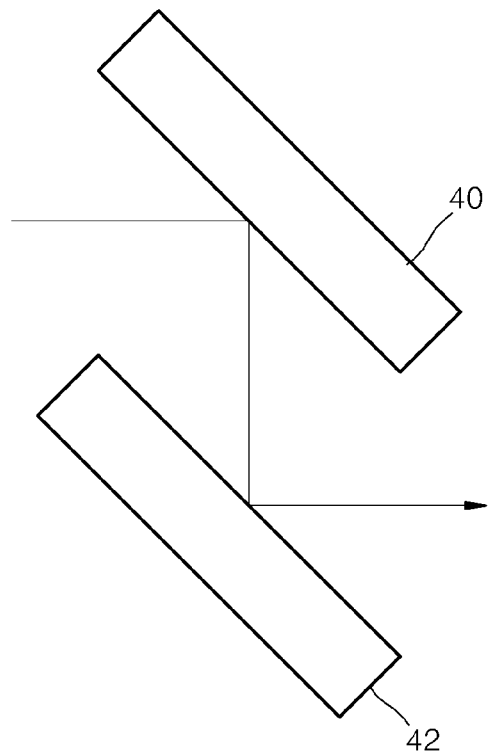

FIG. 24 is a cross-sectional view illustrating that the passive filter 40 and the active filter 42 are arranged on the same optical axis, the passive filter 40 reflects the incident light 38 to the active filter 42, and the active filter 42 reflects the light 38 reflected by the passive filter 40 to an optical image sensor (not shown). In FIG. 24, when the active filter 42 is in an on-state or an off-state, a reflection band of the active filter 42 may overlap with at least a part of a reflection band of the passive filter 40.

Figure 25:
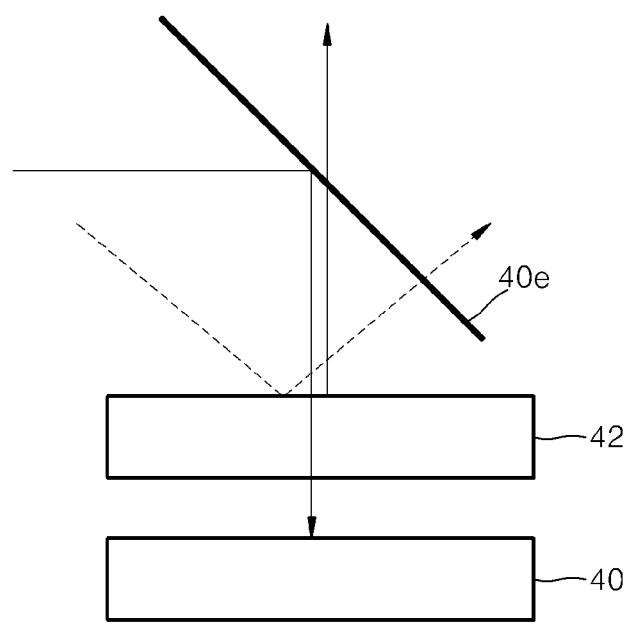

FIG. 25 is a cross-sectional view illustrating that the passive filter 40 and the active filter 42 are disposed so that light incident from a subject is incident on the active filter 42 and is discharged from the active filter 42. In FIG. 25, the passive filter 40 reflects light, which passes through the active filter 42, to the active filter 42. The passive filter 40 and the active filter 42 are aligned with each other in parallel to be spaced apart from each other. When the active filter 42 is in an on-state or an off-state, a transmission band of the active filter 42 may overlap with at least a part of a reflection band of the passive filter 40. A beam splitter 40e may be disposed in front of the passive filter 40, and the optical image sensor may be disposed behind the beam splitter 40e.

In FIG. 25, instead of using the beam splitter 40e, light incident on the active layer 42 may be obliquely incident at a given angle marked by a dotted line. Accordingly, the light obliquely incident on the active filter 42 passes through the active filter 42, is reflected by the passive filter 40, passes through the active filter 42 again, and obliquely travels at a given angle with respect to a top surface of the active filter 42. In this case, the passive filter 40 may be attached to a bottom surface of the active filter 42. The optical image sensor may be located in a direction in which the light is discharged from the active filter 42.

Figure 26:
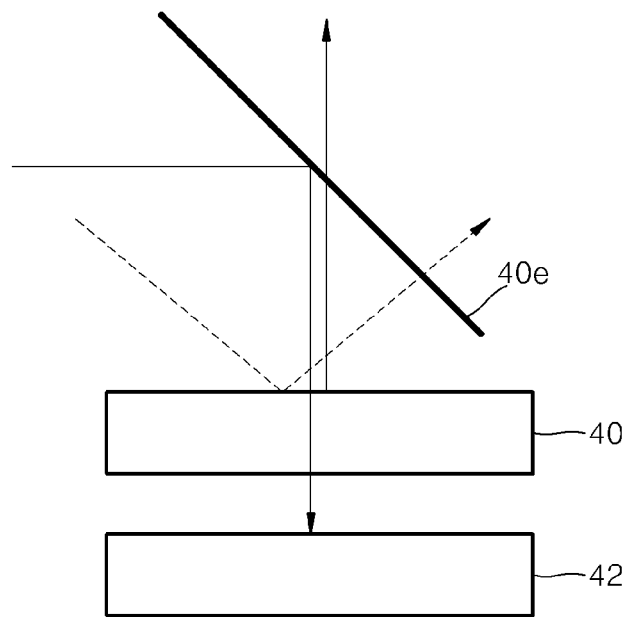

FIG. 26 is a cross-sectional view illustrating that the passive filter 40 and the active filter 42 are disposed in a manner opposite to that of FIG. 25. That is, the passive filter 40 and the active filter 42 are disposed so that light incident from a subject is incident on the passive filter 40 and is discharged from the passive filter 40 again. The active filter 42 reflects light, which passes through the passive filter 40, to the passive filter 40. In FIG. 26, when the active filter 42 is in an on-state or an off-state, a reflection band of the active filter 42 may overlap with at least a part of a transmission band of the passive filter 40. The passive filter 40 and the active filter 42 may be disposed in other ways. Another optical element, for example, a beam splitter, a reflective mirror, or a light modulator, may be disposed between the passive filter 40 and the active filter 42 in FIGS. 21 through 26.

The same explanation of the beam splitter, the obliquely incident light, the position of the optical image sensor, and the attachment of the passive filter 40 and the active filter 42 in FIG. 25 may be given for those in FIG. 26.

The optical shutter 100 of FIGS. 1 and 21 through 26 may be formed by separately forming the passive filter 40 and the active filter 42 and arranging the passive filter 40 and the active filter 42 as shown in FIGS. 1 and 21 through 26. The passive filter 40 may be formed by stacking the first layer 40b and the second layer 40c on the first substrate 40a alternately at least once. The active filter 42 may be formed by stacking the third and fourth layers 42b and 42c on the second substrate 42a alternately at least once to include at least one refractive index variable layer L1. The third and fourth transparent electrodes E3 and E4 for applying an electric field to the refractive index variable layer L1 may be further formed on the active filter 42.

The passive filter 40 and the active filter 42 of the optical shutter 100 of FIG. 1 may be stacked on a single substrate which will be explained with reference to FIGS. 27 through 29.

Figure 27:
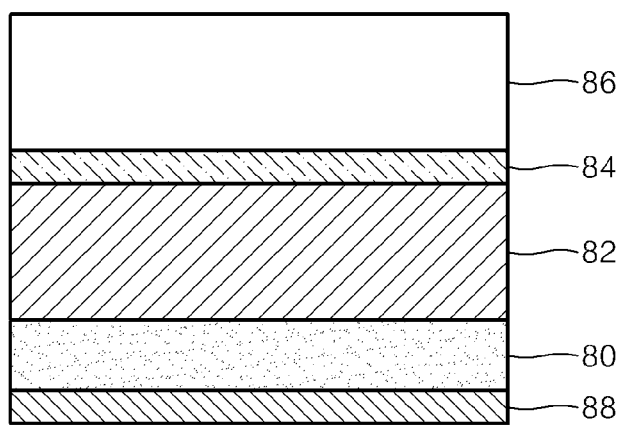
FIGS. 27 through 29 are cross-sectional views illustrating a case where the passive filter and the active filter are provided on a single substrate.
Figure 28:
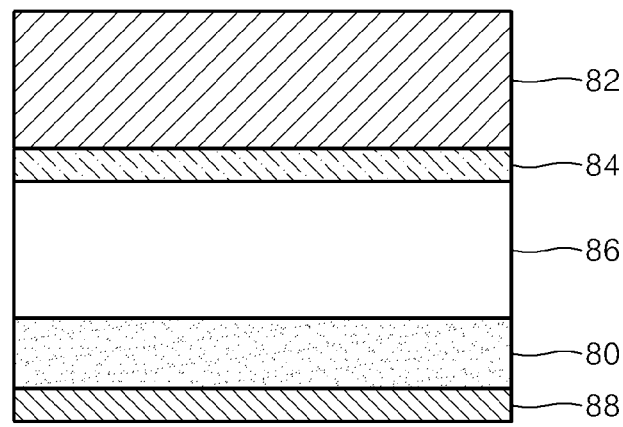
Figure 29:
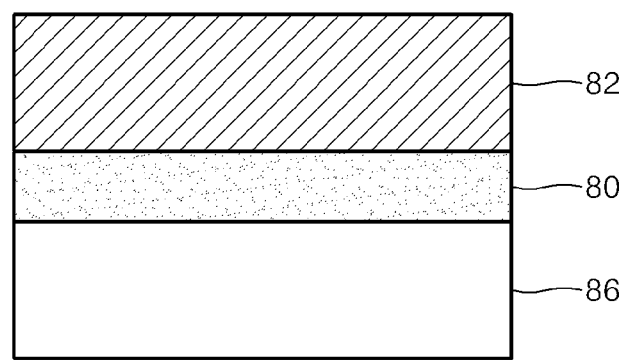

FIGS. 27 through 29 are cross-sectional views illustrating a case where the passive filter 40 and the active filter 42 are provided on a single substrate. Referring to FIG. 27, an active filter layer 82, an interface layer 84, and a passive filter layer 86 are sequentially stacked on a substrate 80. A rear surface of the substrate 80 may be coated with an anti-reflection layer 88. The substrate 80 may be a transparent substrate. The configuration of the active filter layer 82 may be the same as that of a portion that is obtained by removing the second substrate 42a and the anti-reflection layer 42d from the active filter 42 of the optical shutter 100 of FIG. 1. Accordingly, a detailed configuration of the active filter layer 82 is not shown in FIG. 27. The configuration of the passive filter layer 86 may be the same as that of a portion that is obtained by removing the first substrate 40a and the anti-reflection layer 40d from the passive filter 40 of the optical shutter 100 of FIG. 1. Accordingly, a detailed configuration of the passive filter layer 86 is not shown in FIG. 27. The interface layer 84 disposed between the passive filter layer 86 and the active filter layer 82 may be a first layer of the passive filter layer 86 staked on the active filter layer 82.

FIG. 28 is a cross-sectional view illustrating that the passive filter layer 86 and the active filter layer 82 change places with each other. In FIG. 28, the interface layer 84 may be a last layer of the passive filter layer 86.

FIG. 29 is a cross-sectional view illustrating that the active filer layer 82 is disposed on a surface of the transparent substrate 80, for example, a top surface of the transparent substrate 80, and the passive filter layer 86 is disposed on a bottom surface of the transparent substrate 80.

The optical shutters of FIGS. 27 and 28 may be formed by sequentially stacking the active filter layer 82, the interface layer 84, and the passive filter layer 86 on the transparent substrate 80, or sequentially stacking the passive filter layer 86, the interface layer 84, and the active filter layer 82 on the transparent substrate 80. The active filter layer 82 and the passive filter layer 86 may be formed in the same manner as that used to form the active filter 42 and the passive filter 40 of the optical shutter 100 of FIG. 1.

The optical shutter of FIG. 29 may be formed by forming any one of the passive filter layer 86 and the active filter layer 82 on one surface of the transparent substrate 80 and forming the remaining filter layer on the other surface of the transparent substrate 80. Alternatively, the optical shutter of FIG. 29 may be formed by respectively forming the passive filter layer 86 and the active filter layer 82 on two transparent substrates and bonding the two transparent substrates.

A simulation for verifying the operation of the optical shutter 100 will now be explained.

In the simulation, the second substrate 42a of the active filter 42 and the first substrate 40a of the passive filter 40 of the optical shutter 100 of FIG. 1 were glass substrates. The passive filter 40 and the active filter 42 were monochromatic filters. The number of layers stacked on the first substrate 40a of the passive filter 40 was 19, the first layer 40b was formed of magnesium fluoride having a refractive index of 1.35, and the second layer 40c was formed of zinc sulfide having a refractive index of 2.30. A center wavelength λc of light incident on the passive filter 40 was 850 nm, the thickness of the first layer 40b was 157 nm, and the thickness of the second layer 40c was 92 nm. However, the thickness of one of a plurality of the second layers 40c was 184 nm. The number of layers stacked on the second substrate 42a of the active filter 42 was 19, and a first layer of the 19 layers stacked on the second substrate 42a was the active layer 42d including a single variable refractive index layer. The third layer 42b of the active filter 42 was formed of the same material as the first layer 40b of the passive filter 40, and the fourth layer 42c was formed of the same material as the second layer 40c. The variable refractive index layer L1 of the active layer 42d was a KTN layer having a refractive index of 2.31, and had a thickness of 182 nm. The first and second transparent electrodes E1 and E2 were respectively attached to top and bottom surfaces of the variable refractive index layer L1, and the thicknesses of the first and second transparent electrodes E1 and E2 were 100 nm. The optical shutter 100 was maintained in an on-state by applying a voltage of 0 V between the first and second transparent electrodes E1 and E2, and the optical shutter 100 was maintained in an off-state by applying a voltage of 20 V between the first and second transparent electrodes E1 and E2. A refractive index variation Δn of the variable refractive index layer L1 was $10^{-3}$ □E(V/μn)=0.11. A bottom surface of the first substrate 40a of the passive filter 40 and a bottom surface of the second substrate 42a of the active filter 42 were coated with anti-reflection layers.

Figure 30:
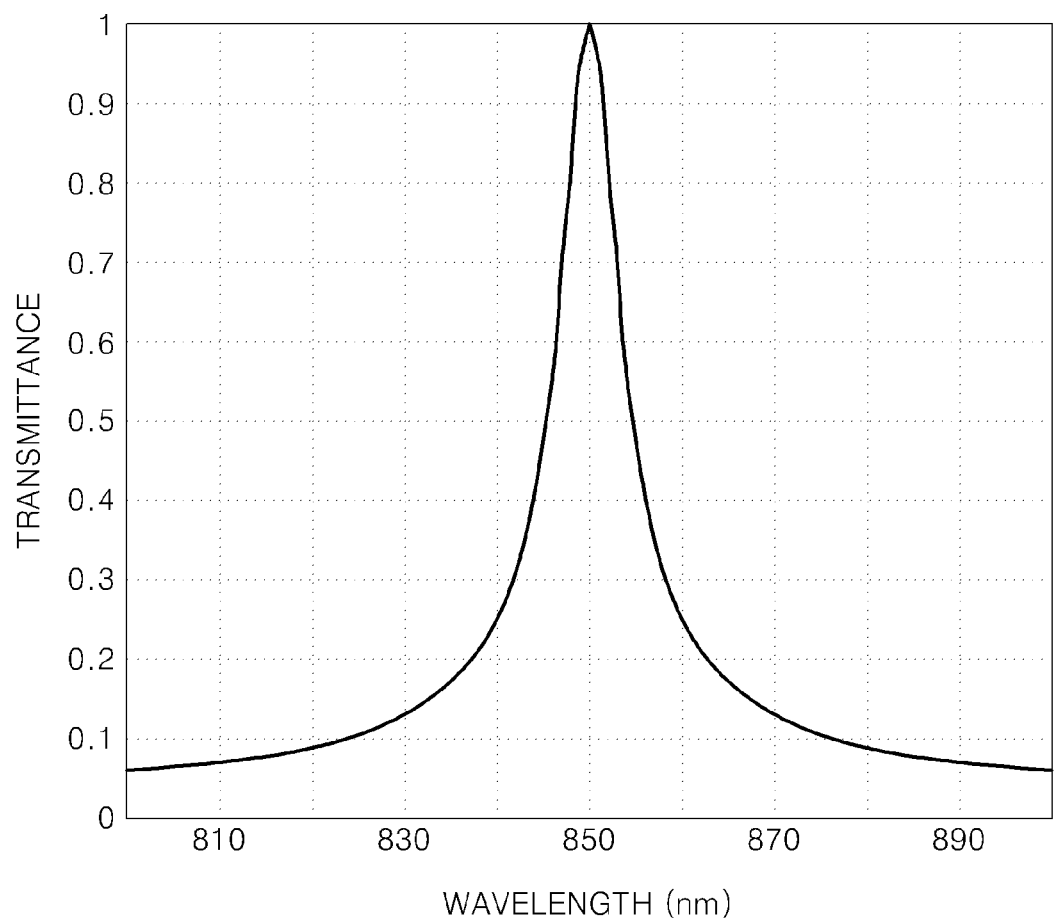
FIG. 30 is a graph illustrating transmission characteristics of the passive filter used in a simulation for verifying the operation of the optical image shutter of FIG. 1.
Figure 31:
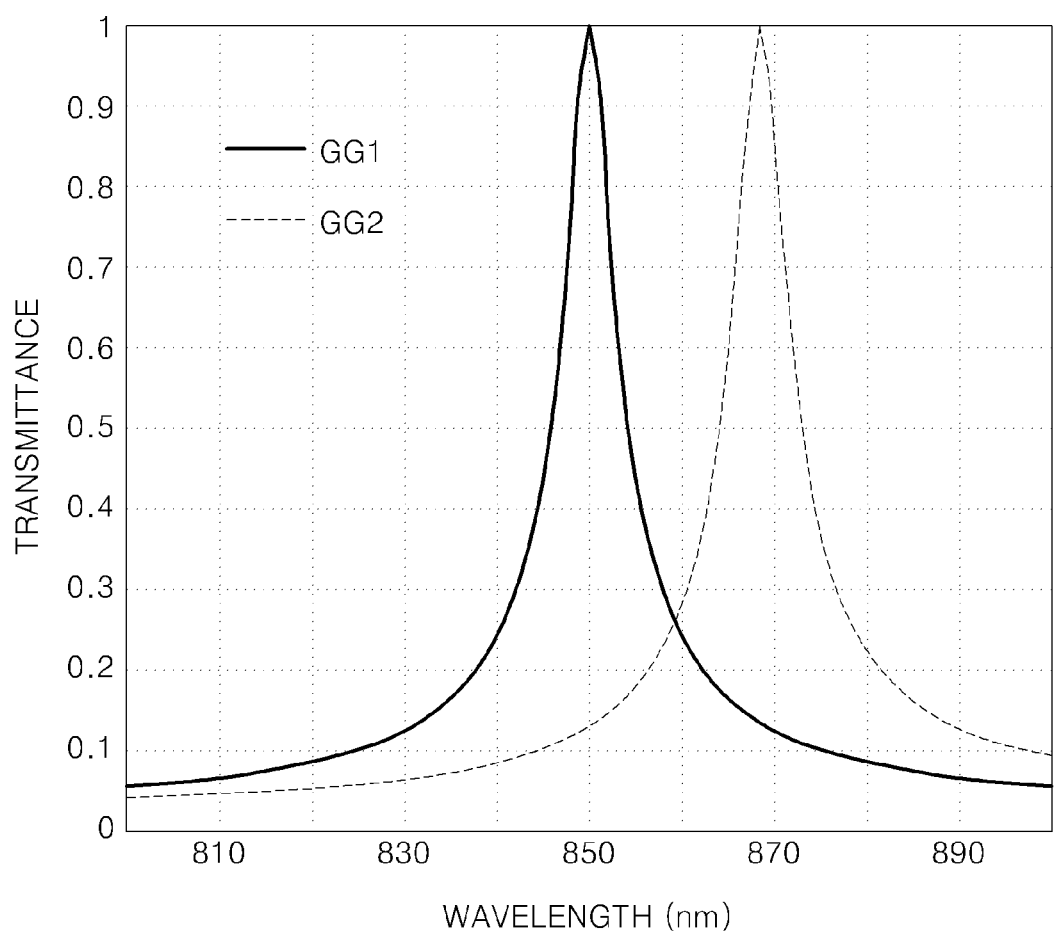
FIG. 31 is a graph illustrating transmission characteristics of the active filter used in the simulation for verifying the operation of the optical image shutter of FIG. 1.

FIGS. 30 and 31 are graphs, respectively illustrating transmission characteristics of the passive filter 40 and the active filter 42 used in the simulation.

Referring to FIG. 30, the passive filter 40 has transmission characteristics for short wavelengths with a center wavelength of 850 nm.

Referring to FIG. 31, when a voltage of 0 V is applied between the first and second transparent electrodes E1 and E2 (referred to as a first mode), that is, when the optical shutter 100 is in an on-state, the active filter 42 has transmission wavelengths for short wavelengths with a center wavelength of 850 nm (see a first graph GG1). When a voltage of 20 V is applied between the first and second transparent electrodes E1 and E2 (referred to as a second mode), that is, when the optical shutter 100 is in an off-state, the active filter 42 has transmission characteristics with short wavelengths with a center wavelength of 870 nm.

Figure 32:
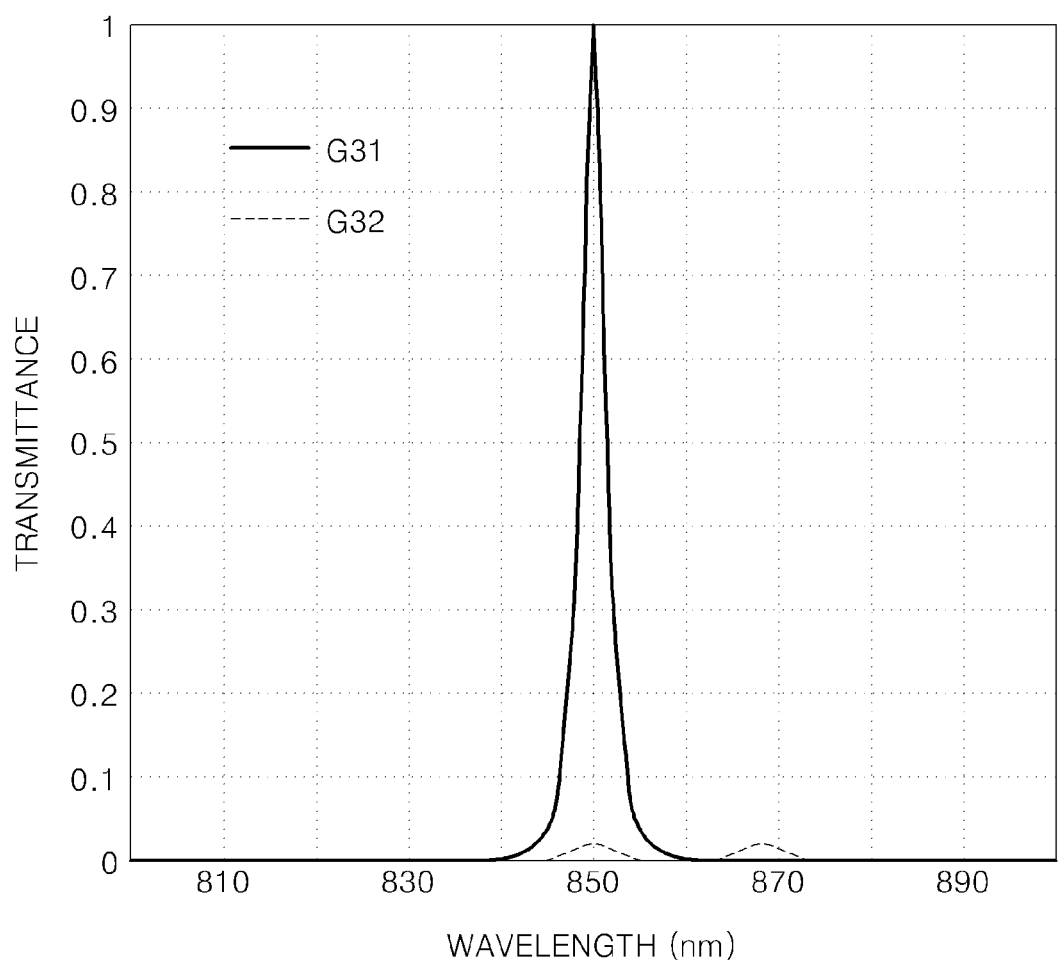
FIG. 32 is a graph illustrating results of the simulation for verifying the operation of the optical image shutter of FIG. 1.

FIG. 32 is a graph illustrating results of the simulation. In FIG. 32, a first graph G31 illustrates transmission characteristics of the optical shutter 100 when the active filter 42 is in the first mode, and a second graph G32 illustrates transmission characteristics of the optical shutter 100 when the active filter 42 is in the second mode.

Referring to FIG. 32, the optical shutter 100 has transmission characteristics for short wavelengths with a center wavelength of 850 nm in the first mode, and the optical shutter 100 has a very small transmittance of less than 2% in the second mode.

It may be seen from the results of FIG. 32 that an image having short wavelengths with a center wavelength of 850 nm may be effectively shut off even by using an existing material. Also, since KTN used as the material of the variable refractive index layer L1 in the simulation has a response speed of less than 1 ns, a shutter speed of the optical shutter 100 may be less than 1 ns. Also, the optical shutter 100 may effectively shut off even an image having short wavelengths with a center wavelength other than 850 nm by appropriately combining the passive filter 40 and the active filter 42 and appropriately selecting a material for the variable refractive index layer L1.

The optical shutter 100 having a shutter speed of less than 1 ns may be applied not only to a three-dimensional (3D) camera but also to a high sped camera, an infrared (IR) imager, or a laser radar (LADAR). If the optical shutter 100 is applied to a display device, an image of the displayed device may be displayed according to time by using the optical shutter 100 as a unit pixel, arranging a plurality of the optical shutters 100 to form an array, and individually driving the optical image shutters 100.

Since incident light may be modulated into various waves, for example, sine, ramping, or square waves, by appropriately combining the passive filter 40 and the active filter 42 of the optical shutter 100, the optical shutter 100 may be used as an optical image modulator.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An optical image shutter comprising:
   a first optical filter having a fixed refractive index and comprising a plurality of layers arranged adjacently to one another; and
   a second optical filter having an electrically variable refractive index and comprising a plurality of layers arranged adjacently to one another;
   wherein the first optical filter is disposed on an optical axis and the second optical filter is disposed on the optical axis in a line with the first optical filter.

2. The optical image shutter of claim 1, wherein the first optical filter comprises a first layer having a first refractive index and a second layer having a second refractive index that is different from the first refractive index, and the first and second layers are stacked alternately at least once in a direction of the optical axis.

3. The optical image shutter of claim 1, wherein the second optical filter comprises at least one refractive index variable layer having a refractive index which is electrically variable.

4. The optical image shutter of claim 3, wherein the second optical filter further comprises two layers having different refractive indexes and stacked alternately at least once in a direction of the optical axis.

5. The optical image shutter of claim 3, further comprising a transparent electrode for applying an electric field to the at least one refractive index variable layer.

6. The optical image shutter of claim 3, wherein the refractive index variable layer is a material layer having electro-optical effect.

7. The optical image shutter of claim 1, wherein the first optical filter is any one selected from the group consisting of a low-pass filter, a high-pass filter, a band-pass filter, a monochromatic filter, a notch filter, a shaping filter, and a Fabry-Perot interference filter.

8. The optical image shutter of claim 7, wherein the second optical filter is any one selected from the group consisting of a variable low-pass filter, a variable high-pass filter, a variable band-pass filter, a variable monochromatic filter, a variable notch filter, a variable shaping filter, and a variable Fabry-Perot interference filter.

9. The optical image shutter of claim 1, wherein the second optical filter is any one selected from the group consisting of a variable low-pass filter, a variable high-pass filter, a variable band-pass filter, a variable monochromatic filter, a variable notch filter, a variable shaping filter, and a variable Fabry-Perot interference filter.

10. The optical image shutter of claim 1, wherein the first and second optical filters are separated from each other or integrated together.

11. The optical image shutter of claim 10, wherein, if the first and second optical filters are separated from each other, the first and second optical filters are disposed parallel to each other or one of the first and second optical filters is inclined with respect to the remaining optical filter.

12. The optical image shutter of claim 1, further comprising an optical element disposed on the optical axis between the first and second optical filters.

* * * * *